United States Patent
Yanai et al.

(10) Patent No.: US 8,839,692 B2
(45) Date of Patent: Sep. 23, 2014

(54) WALK-BEHIND TILLER WITH ADJUSTABLE HANDLE MECHANISM

(75) Inventors: Kiyomi Yanai, Saitama (JP); Ai Habuka, Saitama (JP); Misako Hamani, Saitama (JP); Mai Ohba, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1169 days.

(21) Appl. No.: 11/986,735

(22) Filed: Nov. 26, 2007

(65) Prior Publication Data

US 2008/0121065 A1 May 29, 2008

(30) Foreign Application Priority Data

Nov. 28, 2006 (JP) ................ P2006-320526

(51) Int. Cl.
*A01B 33/02* (2006.01)
*B62K 21/16* (2006.01)

(52) U.S. Cl.
CPC .................................. *A01B 33/028* (2013.01)
USPC .......... 74/551.4; 74/551.3; 74/551.1; 16/438; 172/366

(58) Field of Classification Search
USPC ....... 74/551.3–551.7; 56/DIG. 18, 10.8, 11.6, 56/14.8, 16.7; 16/437, 438, 900; 248/125.1, 538, 284.1; 172/350, 345, 172/366; 37/243, 265, 278, 284, 285; 180/19.3; 280/655, 655.1; 403/94, 98
See application file for complete search history.

(56) References Cited

U.S. PATENT DOCUMENTS

| | | | | | |
|---|---|---|---|---|---|
| 123,707 | A | * | 2/1872 | Kind | 280/47.371 |
| 267,837 | A | * | 11/1882 | Clark | 16/112.1 |
| 854,424 | A | * | 5/1907 | Ketterer | 56/253 |
| 979,091 | A | * | 12/1910 | Pickart | 403/98 |
| 3,702,016 | A | * | 11/1972 | Keesee | 16/437 |
| 4,286,670 | A | * | 9/1981 | Ackerman | 172/42 |
| 5,375,674 | A | * | 12/1994 | Peter | 180/19.3 |
| 5,513,873 | A | * | 5/1996 | Chen | 280/655 |
| 6,082,083 | A | * | 7/2000 | Stalpes et al. | 56/11.6 |
| 6,332,621 | B1 | * | 12/2001 | Wu | 280/87.041 |
| 6,347,593 | B1 | * | 2/2002 | Moran et al. | 172/123 |
| 6,644,002 | B2 | * | 11/2003 | Trefz | 56/10.8 |
| 6,796,392 | B2 | * | 9/2004 | Kobayashi et al. | 180/19.3 |
| 6,854,526 | B2 | * | 2/2005 | Yamazaki et al. | 172/42 |
| 2002/0092132 | A1 | * | 7/2002 | Kessler | 16/436 |
| 2006/0053762 | A1 | * | 3/2006 | Stover et al. | 56/16.7 |

FOREIGN PATENT DOCUMENTS

| | | |
|---|---|---|
| JP | H05-055805 | 7/1993 |
| JP | 11-178401 | 7/1999 |
| JP | 2004-217116 | 8/2004 |
| JP | 2006-006148 | 1/2006 |

* cited by examiner

*Primary Examiner* — Daniel Yabut
(74) *Attorney, Agent, or Firm* — Carrier Blackman & Associates, P.C.; William D. Blackman; Joseph P. Carrier

(57) ABSTRACT

A work machine having a loop-shaped operating handle connected to an upper end part of a handle post. The operating handle pivots to positions in the longitudinal direction of the work machine across a longitudinal axis of the handle post as a baseline.

15 Claims, 12 Drawing Sheets

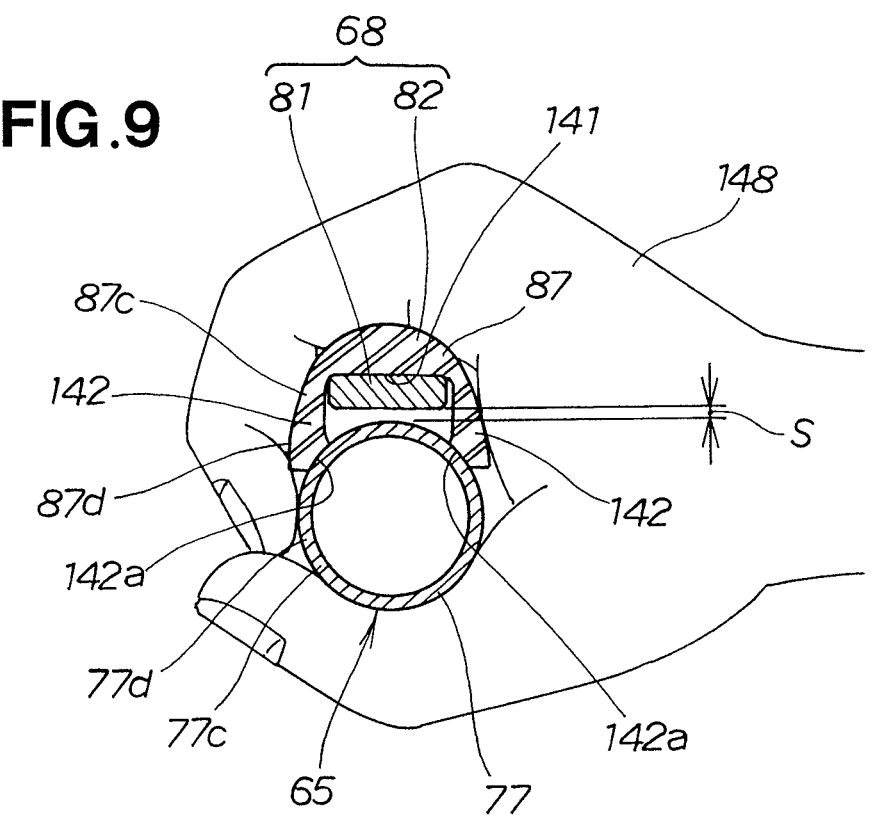

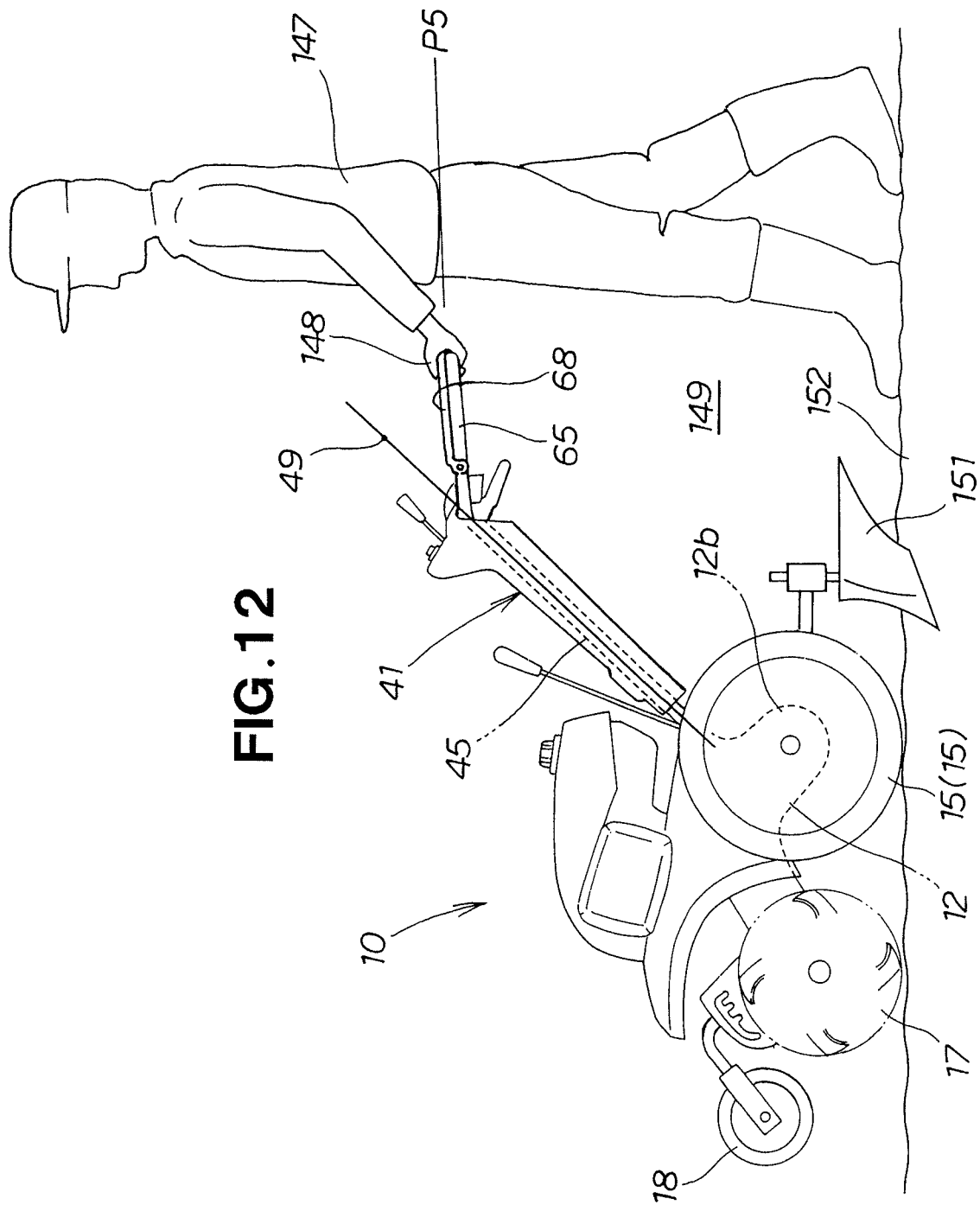

WALK-BEHIND TILLER WITH ADJUSTABLE HANDLE MECHANISM

CROSS-REFERENCE TO RELATED APPLICATIONS

The present application is based upon, and claims the benefit under 35 USC 119 of priority from Japanese Patent Application No. 2006-320526, filed Nov. 28, 2006. The entire contents of the referenced priority application, including specification, claims and drawings, are incorporated herein by reference.

FIELD OF THE INVENTION

The present invention relates to a work machine having a loop-shaped operating handle connected to an upper end part of a handle post provided to a work machine body.

BACKGROUND OF THE INVENTION

Japanese Patent Application Laid-Open Publication No. 11-178401 (JP 11-178401 A) discloses a tiller in which the height position of a grip is adjusted by rotating an operating handle in the longitudinal direction in order to adjust to the body height of an operator.

This tiller has a handle post that is provided to a rear part of the tiller body so as to tilt upwards toward the rear direction; and an operating handle that is supported on an upper end part of the handle post so that the angle (height) can be adjusted in the longitudinal direction. The height of the grip is changed by adjusting the angle of the handle in the longitudinal direction.

In the work mode of the tiller, the body weight of the operator is applied to the front part of the tiller in order to till deeply, and the grip must be raised in such cases. However, the grip and operating handle are integrally formed in the tiller, and therefore the grip cannot be moved to the forward position of the handle post even when the grip is rotated in the forward direction and raised with the operating handle. When the angle of the operating handle is changed so that the grip will be raised, the grip will be inclined downward toward the front.

Since the grip and operating handle are integrally formed, it has thus been necessary in the past to change the angle by rotating the operating handle in order to raise the grip to suit the body height of the operator. Specifically, the grip is located to the rear of the handle post and is inclined downward toward the front. It is therefore difficult for the body weight of the operator to be applied to the front part of the tiller while the operator is grasping the grip, and the tiller is difficult to use.

SUMMARY OF THE INVENTION

An object of the present invention is to provide a work machine in which an operator can readily apply body weight to a front part of the work machine, and the height of a grip can be readily adjusted to suit the body height of the operator, thereby making the work machine easy to use.

According to the present invention, there is provided a work machine comprising: a work machine body; a handle post provided to a rear part of the work machine body and extending rearwardly upwardly in an inclined manner; and a loop-shaped operating handle connected to an upper end part of the handle post and having a support shaft extending in a direction of width of the work machine body, wherein, depending on a working mode, the loop-shaped operating handle is adapted to pivot in a front-and-rear direction of the work machine across a longitudinal axis of the handle post as a baseline, with the support shaft used as a fulcrum.

When the work machine is used, the operating handle is preferably able to be selected at the optimal height according to the working mode (e.g., travel, tilling, cultivating).

In the work machine of the present invention, the operating handle can be pivoted to a position in the longitudinal direction, with the extension line of the handle post acting as a boundary, whereby the operating handle can be set in a horizontal state and at an upward incline towards the front of the work machine body, and the operating handle can be disposed at a position preferred by the operator. Consequently, while grasping the operating handle, the operator can readily apply body weight to the front part of the work machine, allowing tilling work mode to be readily enabled.

If the operating handle is positioned farther toward the rear than the extension line of the handle post adequate space will be maintained between the work machine body and the operator. This space can be used to attach, e.g., a cultivator to the rear part of the work machine body, allowing cultivating work mode to be readily enabled.

It is possible for the working mode to be readily enabled if the operating handle is pivotably provided to the upper end part of the handle post.

The position of the operating handle can thus be selected to an optimal position in association with the work mode (e.g., tilling, cultivating, and travel) of the work machine, accordingly allowing an increase in utility to be achieved.

Preferably, the handle post has a plurality of post segments separated in the longitudinal direction, and the post segments are configured so as to be able to slide in the longitudinal direction. If the plurality of post segments is slid in the longitudinal direction, the height of the operating handle can thus be adjusted to an optimal height to suit the personal attributes of the operator (body height, gripping strength, or the like) or the work mode, and usability can be improved.

Desirably, the loop-shaped operating handle has in an inner peripheral wall a central curved part provided at a widthwise center of the work machine body and protruding inwardly of the loop. With the central curved part thus provided to the center of the operating handle, the operator can identify the center curved part from the sensation of grasping the operating handle and can identify the center position. Additionally, when the operator is grasping the operating handle, his/her hands can be prevented from slipping along the operating handle by the center curved part.

It is preferable that a clutch lever for travel mode be pivotably provided to the operating handle. The clutch lever has a metal lever part that is pivotably provided to the operating handle, and a resin cover that covers the lever part. Using a metal lever part for the clutch lever ensures that the clutch lever will be rigid. Covering the metal lever part using a resin cover allows the resin cover to be readily formed in a shape that is easy to grip, the rigidity of the clutch lever to be ensured, and the comfort of the grip of the clutch lever to be improved.

The post segments preferably have slide switching means for switching between a state in which the post segments are slidable in the longitudinal direction, and a state in which the post segments are kept in a predetermined position. The slide switching means switches between a state in which the plurality of post segments is able to slide in the longitudinal direction, and a state in which the post segments are kept in a predetermined position. It is thereby possible to readily adjust the height of the handle post by operating the slide switching means.

BRIEF DESCRIPTION OF THE DRAWINGS

Certain preferred embodiments of the present invention will be described in detail below, by way of example only, with reference to the accompanying drawings, in which:

FIG. 9 is a cross-sectional view taken along line 9-9 of FIG. 8;

FIG. 12 is a schematic side view showing the tiller with a cultivator attached to its rear part.

DETAILED DESCRIPTION OF THE PREFERRED EMBODIMENTS

Figure 1:
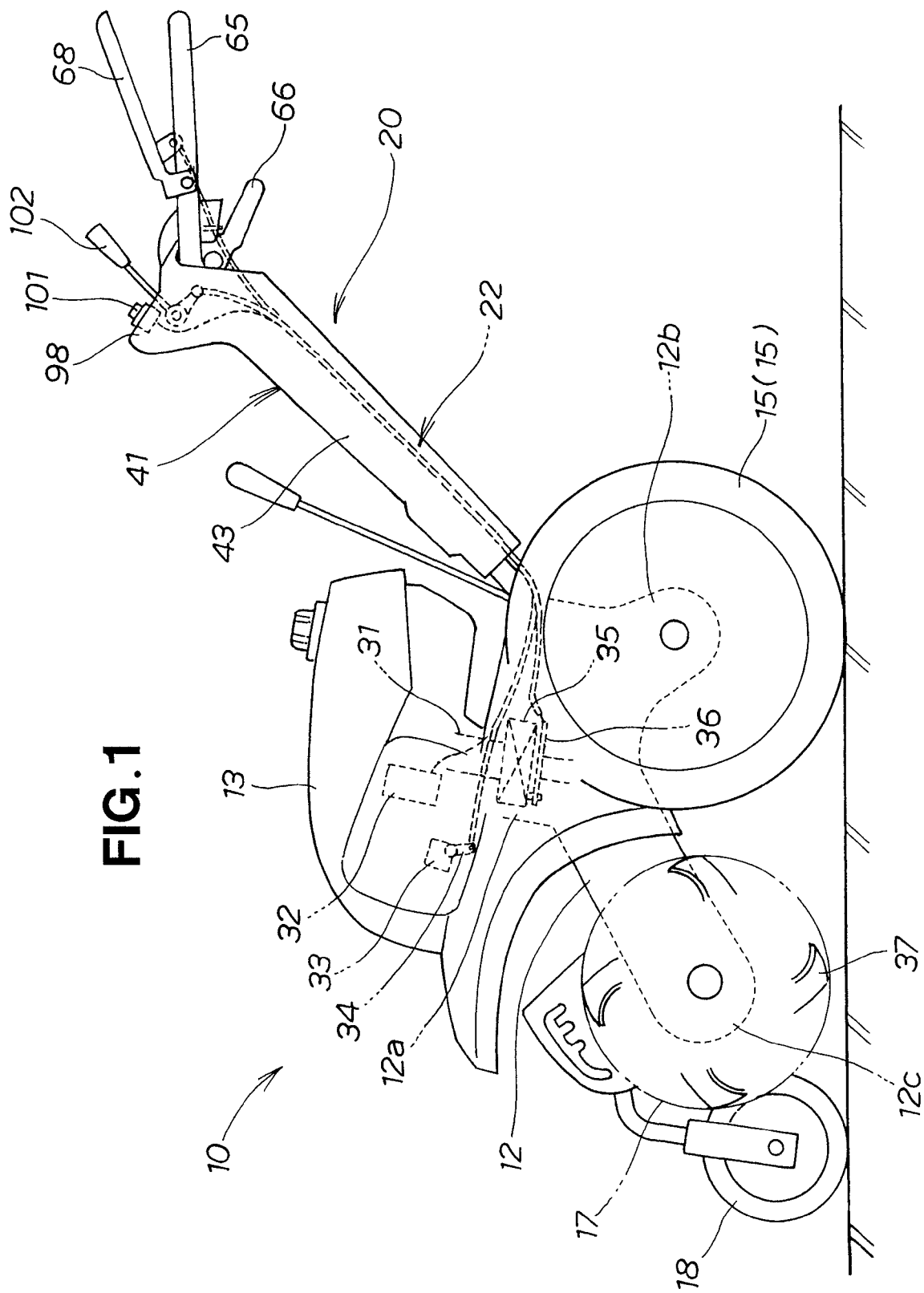
FIG. 1 is a side elevational view of a tiller as an example of the work machine according to the present invention.

As shown in the drawings, the embodiment of the work machine of the present invention is an example of a walk-behind tiller. However, the work machine of the present invention is not limited to being a walk-behind tiller, and may also be used in, e.g., a lawnmower, a snow remover, or another work machine.

A walk-behind tiller 10 as shown in FIG. 1 has an engine 13 mounted on a top part 12a of a transmission case 12 that is also a tiller body. A transmission mechanism (not shown) is provided inside the transmission case 12. Left and right drive wheels 15, 15 are provided to a rear end part 12b of the transmission case 12. A rotary work part 17 and an auxiliary wheel 18 are provided to a front end part 12c of the transmission case 12. A handle device 20 is provided to the rear end part 12b of the transmission case 12. The member on the side of the handle device 20 and the member on the side of the transmission case 12 are connected by an arranging structure 22 comprising a linear member.

The engine 13 has a crankshaft 31, which is an output shaft, and the crankshaft 31 is disposed vertically. In other words, the engine is a vertical engine that extends downwards. The engine 13 has an ignition starter motor 32, and a throttle lever 34 for adjusting the angle of a throttle valve 33.

The lower end part of the crankshaft 31 is connected to the transmission mechanism via a travel clutch 35. The transmission mechanism and the travel clutch 35 are provided inside the transmission case 12.

The travel clutch 35 has a clutch lever 36 for switching the travel clutch 35 on and off. Turning on the travel clutch 35 causes the rotation of the engine 13 to be transmitted to the drive wheels 15, 15 and the rotary work part 17 via the transmission mechanism. The rotary work part 17 is thereby made to rotate while the tilling machine is made to move by the left and right drive wheels 15, 15. In the depicted embodiment, the rotary work part 17 is a tilling wheel having a plurality of tilling blades 37 thereon. The rotating of the rotary work part 17 causes the tilling blades 37 to rotate and the soil to be tilled.

When the travel clutch 35 is turned off, the rotation of the engine 13 is not transmitted to the transmission mechanism. The left and right drive wheels 15, 15 are thereby brought to a stationary state, and the rotary work part 17 is also brought to a stationary state.

Next, the handle device 20 will be described according to FIGS. 2 through 9.

Figure 2:
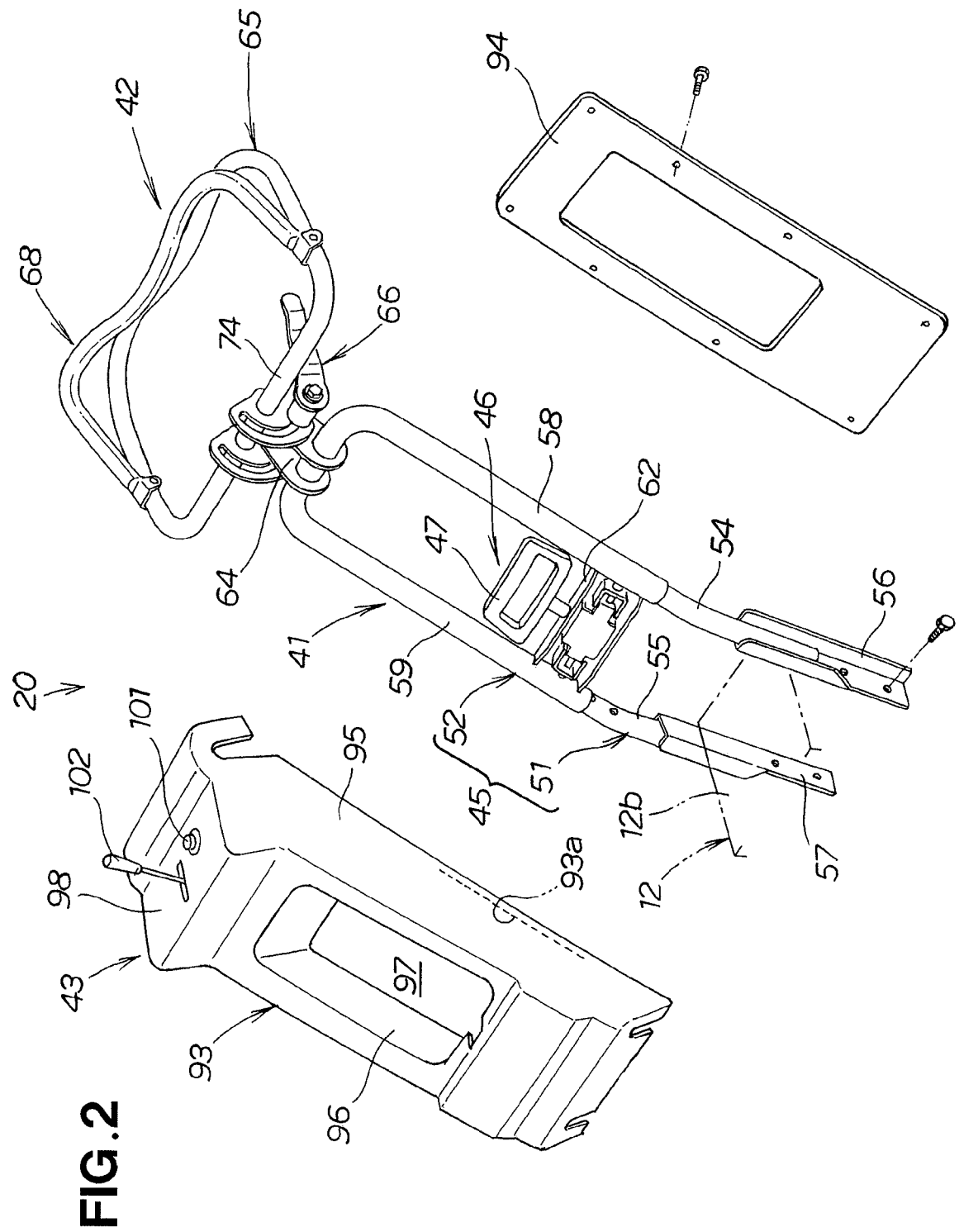
FIG. 2 is an exploded perspective view of a handle device shown in FIG. 1.
Figure 3:
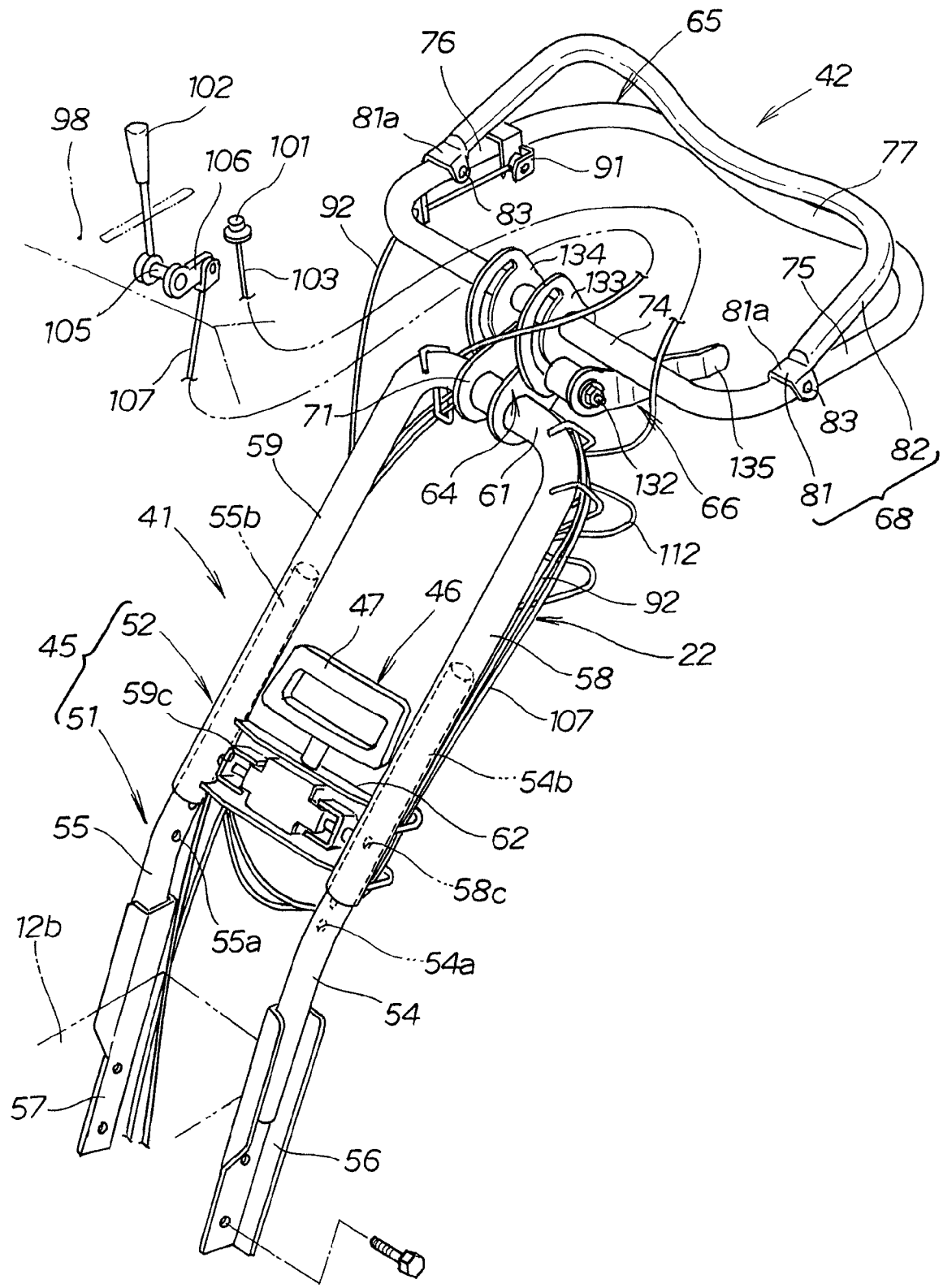
FIG. 3 is a perspective view showing the handle device shown in FIG. 2, with its handle post cover removed.

In FIGS. 2 and 3, the handle device 20 has a handle post unit 41 provided to the rear end part 12b of the transmission case 12; an operating handle unit 42 pivotably provided to an upper end part of the handle post unit 41; and a handle post cover 43 for covering the handle post unit 41 and a portion of the operating handle unit 42.

The handle post unit 41 has a handle post 45 that is retractably provided to the rear end part 12b of the transmission case 12, and slide switching means 46 for retractably switching the handle post 45.

The handle post 45 comprises a lower fixed or stationary post (post segment) 51 and an upper raising/lowering post (post segment) 52 that are separated into a plurality (two) of sections in the longitudinal direction.

The lower fixed post 51 has left and right lower posts 54, 55. The left lower post 54 is bolted to the rear end part 12b of the transmission case 12 via a left mounting bracket 56. The right lower post 55 is bolted to the rear end part 12b of the transmission case 12 via a right mounting bracket 57.

The left and right lower posts 54, 55 are formed from pipes, and extend from the rear end part 12b of the transmission case 12 so as to be inclined upwards and towards the rear.

The left and right lower posts 54, 55 have a plurality of left and right lock holes 54a, 55a formed on opposing sides at a prescribed interval, as shown in FIG. 3.

The upper raising/lowering post 52 has a left upper post 58 that is slidably fitted onto the upper half 54b of the left lower post 54; a right upper post 59 that is slidably fitted onto the upper half 55b of the right lower post 55; a support beam part (upper end part of the handle post) 61 that is connected to the upper end parts of the left and right upper posts 58, 59; and a post connecting member 62 that spans the lower end parts of the left and right upper posts 58, 59.

The upper raising/lowering post 52 is a curved U-shaped member formed by the left and right upper posts 58, 59 and the support beam part 61. The left and right upper posts 58, 59 and the support beam part 61 are pipes.

The left and right upper posts 58, 59 each have left and right holding holes 58c, 59c formed in the opposing sides thereof.

Thus, the handle post 45 extends from the rear end part 12b of the transmission case 12 so as to be inclined upward and toward the rear. The upper raising/lowering post 52 is mounted on the lower fixed post 51 so as to be able to slide in the longitudinal direction.

The slide switching means 46 is provided to the post connecting member 62, and switches between a state in which the upper raising/lowering post 52 can be slid in the longitudinal direction, and a state in which the upper raising/lowering post 52 is held at a prescribed position. The slide switching means 46 will be described in detail below.

The operating handle unit 42 has a support member 64 attached to the support beam part 61 of the handle post 45; an operating handle 65 that is pivotably provided to the support member 64; pivot switching means 66 provided to the support member 64; and a travel clutch operating lever 68 that is pivotably provided to the operating handle 65.

The support member 64 has a support bracket 71 attached to the support beam part 61, and a housing concavity 72 (see FIG. 6) formed in the support bracket 71. The housing concavity 72 rotatably supports a handle support shaft part (support shaft) 74 of the operating handle 65.

The pivot switching means 66 switches between a state in which the operating handle 65 can be pivoted, and a state in which the operating handle is held in a prescribed position. The pivot switching means will be described below using FIG. 6.

The operating handle 65 has a handle support shaft part 74 that extends in the width direction of the transmission case 12 (hereinafter referred to as "width direction of the work machine body"); left and right handle side parts 75, 76 that extend toward the rear from the left and right end parts of the handle support shaft part 74; and a handle grip part 77 that extends between the rear end parts of the left and right handle side parts 75, 76. The operating handle 65 forms a substantially rectangular-shaped loop from the handle support shaft part 74, the left and right handle side parts 75, 76, and the handle grip part 77.

The travel clutch operating lever 68 is pivotably provided to the operating handle 65.

The clutch operating lever 68 has a substantial U shape as viewed from above, and has a metal lever part 81 that is pivotably provided to the operating handle 65, and a resin cover 82 for covering the lever part 81.

When viewed from above, the lever part 81 has the same shape as the left and right handle side parts 75, 76 and the handle grip part 77. Left and right end parts 81a, 81a are rotatably supported on the left and right handle side parts 75, 76 by support pins 83, 83.

A cable bracket 91 is provided in the vicinity of the right end part 81a of the lever part 81, and is connected to the clutch lever 36 (FIG. 1) via a clutch cable 92.

When the clutch operating lever 68 and the operating handle 65 are grasped together, the clutch operating lever 68 will be laid over on the operating handle 65. The clutch cable 92 is pulled and the travel clutch 35 is switched on.

When released, the clutch operating lever 68 separates from the operating handle 65. The clutch cable 92 is released from the pulled state, and the travel clutch 35 is switched off.

The handle post cover 43 has an upper cover part 93 and a lower cover part 94, as shown in FIG. 2.

The upper cover part 93 has a substantially rectangular-shaped outer peripheral wall 95, and a substantially rectangular-shaped inner peripheral wall 96. A substantially rectangular-shaped center opening part 97 is thereby formed in the center of the upper cover part 93, and an operating panel 98 is formed on the upper end part.

The upper cover part 93 covers the upper raising/lowering post 52, the slide switching means 46, the handle support shaft part 74, and the pivot switching means 66.

The lower cover 94 is bolted to the upper cover 93 so as to fill in a bottom opening 93a (see FIG. 5) of the upper cover 93.

A switch handle 47 of the slide switching means 46 is provided in the center opening part 97.

A starter switch 101 and a throttle operating lever 102 are provided to the operating panel 98. The starter switch 101 is connected to a starter motor 32 (FIG. 1) of the engine 13 via a wiring harness 103 shown in FIG. 3. The starter switch 101 is pushed, whereby the switch is turned on, the starter motor 32 is actuated, and the engine 13 is started.

The throttle operating lever 102 is connected to a lever 106 via a support shaft 105, as shown in FIG. 3. The lever 106 is connected to the throttle lever 34 (FIG. 1) via a throttle cable 107. Operating the throttle operating lever 102 in the longitudinal direction causes the throttle lever 34 to be operated and the angle of the throttle valve 33 to be adjusted.

As shown in FIG. 3, the arranging structure 22 formed as a linear member has the clutch cable 92 for connecting the clutch operating lever 68 and the clutch lever 36 (FIG. 1); the throttle cable 107 for connecting the throttle operating lever 102 and the throttle lever 34 (FIG. 1); and the wiring harness 103 for connecting the starter switch 101 and the starter motor 32.

A portion of the clutch cable 92 between the clutch operating lever 68 and the clutch lever 36 has a loop shape. A portion of the throttle cable 107 between the throttle operating lever 102 and the throttle lever 34 has a loop shape. The looped-shaped portions of the clutch cable 92 and the throttle cable 107 are ordinarily accommodated in a space formed in the handle post cover 43.

The wire harness 103 is formed from a non-flexible part (not shown) and a flexible part 112. The flexible part 112 is ordinarily accommodated in the handle post cover 43.

Figure 4:
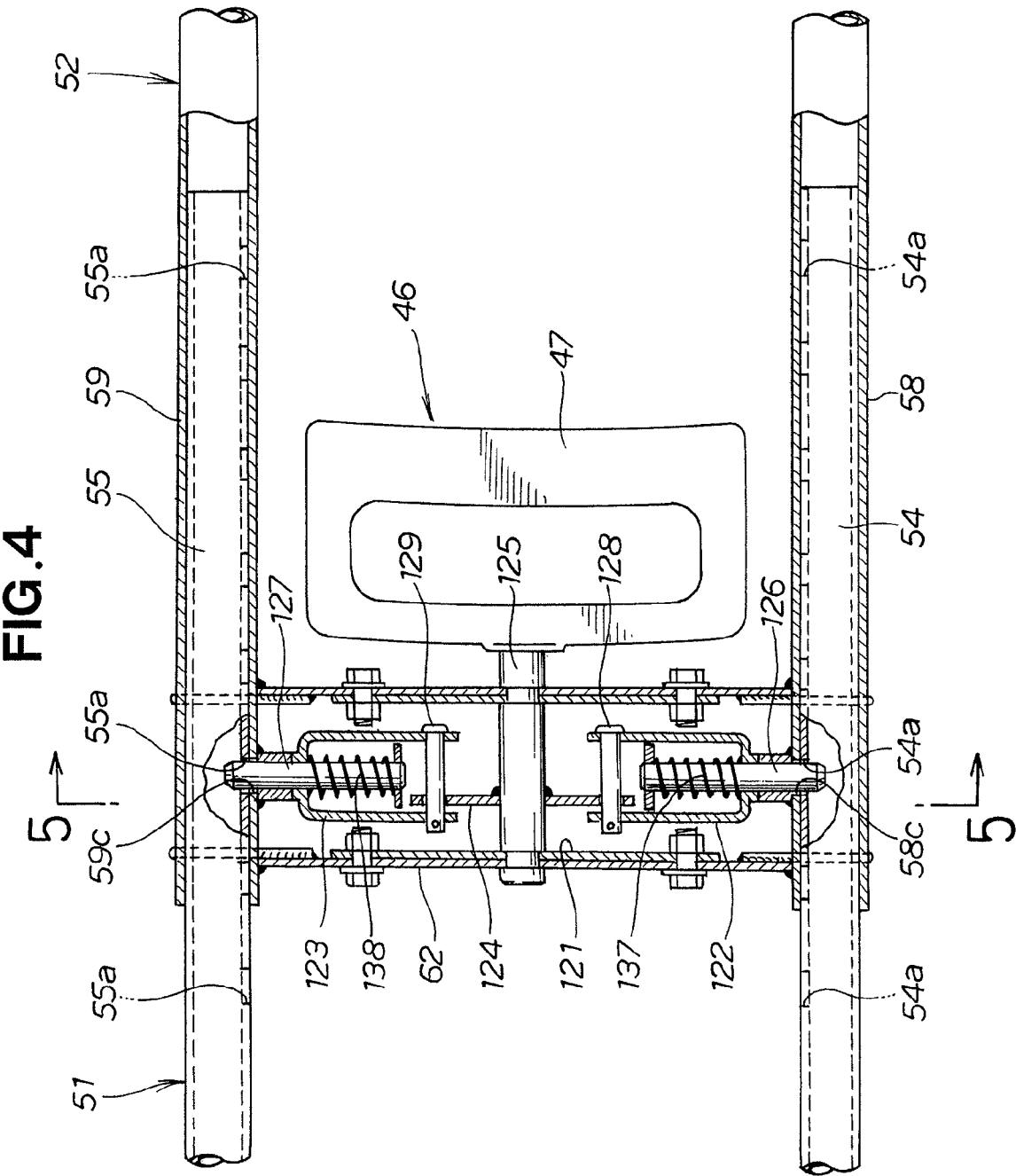
FIG. 4 is a cross-sectional view showing a slide switching mechanism of the handle device of FIG. 3.
Figure 5:
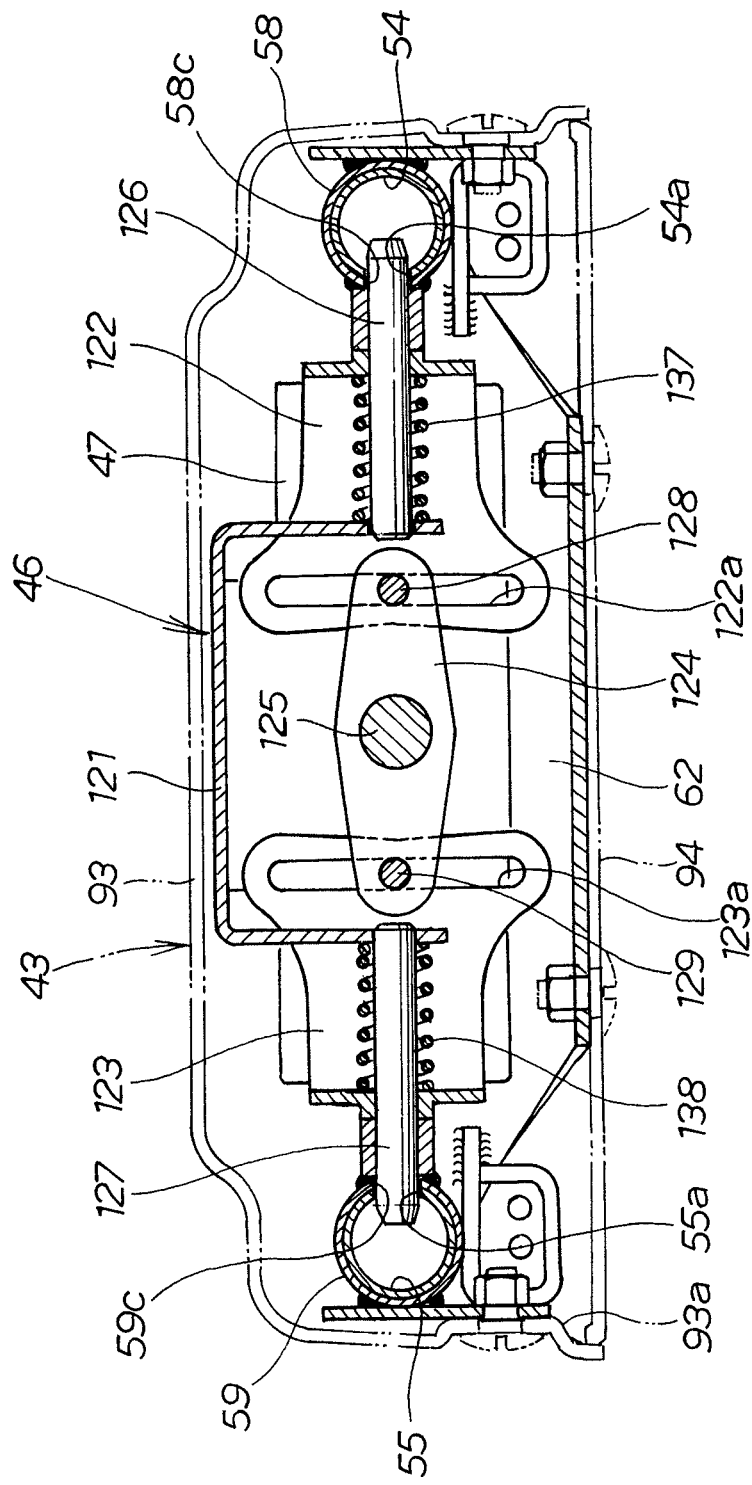
FIG. 5 is a cross-sectional view taken along line 5-5 of FIG. 4.

As shown in FIGS. 4 and 5, the slide switching means 46 has a post connecting member 62; a handle bracket 121 provided to the post connecting member 62; a left moving body 122 disposed to the left of the handle bracket 121; a right moving body 123 disposed on the right of the handle bracket 121; a lever 124 connected between the left and right moving bodies 122, 123 via connecting pins 128, 129; and a switch handle 47 connected to the lever 124 via a rotating shaft 125.

The left connecting pin 128 is slidably fitted into a slot 122a formed in the left moving body 122, as shown in FIG. 5. The right connecting pin 129 is slidably fitted into a slot 123a formed in the right moving body 123.

A left locking pin 126 of the left moving body 122 is disposed so as to be able to be advanced into or retracted from the left holding holes 58c and left locking holes 54a provided to the left upper post 58 and the left lower fixed post 54. The right locking pin 127 of the right moving body 123 is disposed so as to be able to be advanced into or retracted from the right holding holes 59c and the right locking holes 55a provided in the right upper post 59 and the right lower fixed post 55.

The rotating shaft 125 is rotatably supported by the post connection member 62 in a center area in the width direction of the machine, and by a center area of the handle bracket 121.

According to the slide switching means 46, when the switch handle 47 is manually rotated, the rotating shaft 125 rotates, and the lever 124 pivots along with the rotating shaft 125. The left and right moving bodies 122, 123 are moved toward the rotating shaft 125 via the left and right connecting pins 128, 129, according to the pivoting of the lever 124. Therefore, the left locking pin 126 will be pulled out of the left holding holes 58c and the left locking hole 54a, and the right locking pin 127 will be pulled out of the right holding hole 59c and the right locking hole 55a. In other words, the left upper post 58 and left lower post 54 will be released, and the right upper post 59 and the right lower post 55 will be released.

Consequently, the left and right upper posts 58, 59 can slide along the left and right lower posts 54, 55, and the upper raising/lowering post 52 can slide along the lower fixed post 51 so as to be able to be raised and lowered.

In order to keep the upper raising post 52 at a prescribed position, the operator removes their hand from the switch handle 47, and rotating force is released, whereupon the left locking pin 126 enters the left holding hole 58c and the left locking hole 54a via spring force from left and right return springs 137, 138. The right locking pin 127 also enters the right holding hole 59c and the right locking hole 55a, a locked state is achieved, and the upper raising/lowering post 52 is kept in a prescribed position.

Merely operating (rotating) the switch handle 47 thus makes it possible to switch between a state in which the upper raising/lowering post 52 able to slide and a state in which the upper raising/lowering post 52 is kept at a prescribed position, and the height of the handle post 45 is readily adjusted.

The number of the plurality of left and right locking holes 54a, 55a can be arbitrarily set, and the number of levels the upper raising/lowering post 52 can be raised or lowered is determined on the basis of the number of the left and right locking holes 54a, 55a.

For example, when there are nine left and right locking holes 54a, 55a, the upper raising/lowering post 52 can be raised or lowered nine levels.

Figure 6:
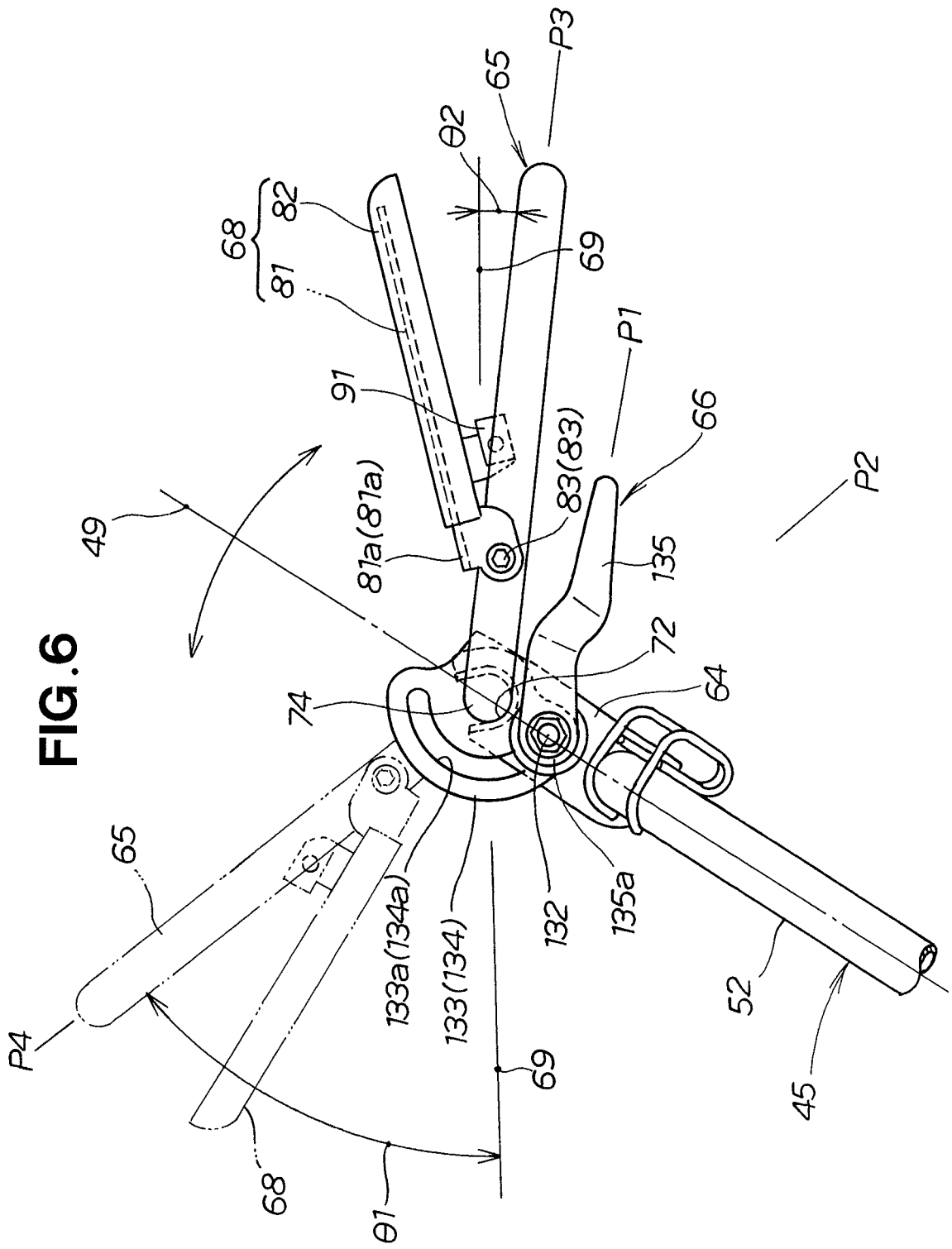
FIG. 6 is a side elevational view showing an operating handle unit of FIG. 3 being in an operating state.
Figure 7:
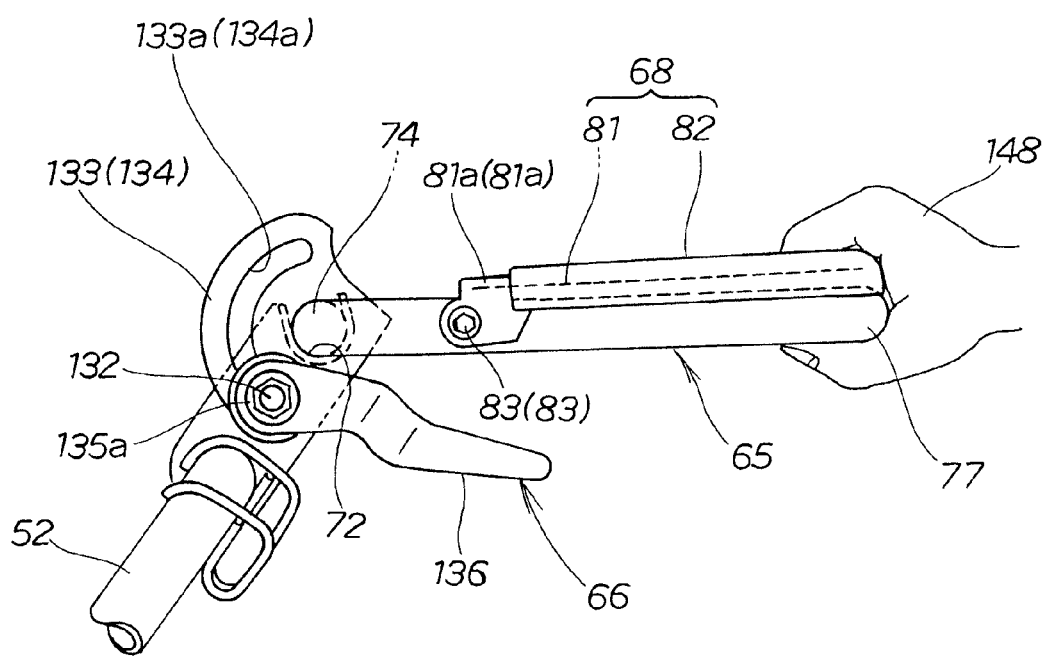
FIG. 7 is a side elevational view showing the operating handle of FIG. 6 being gripped with a hand.
Figure 8:
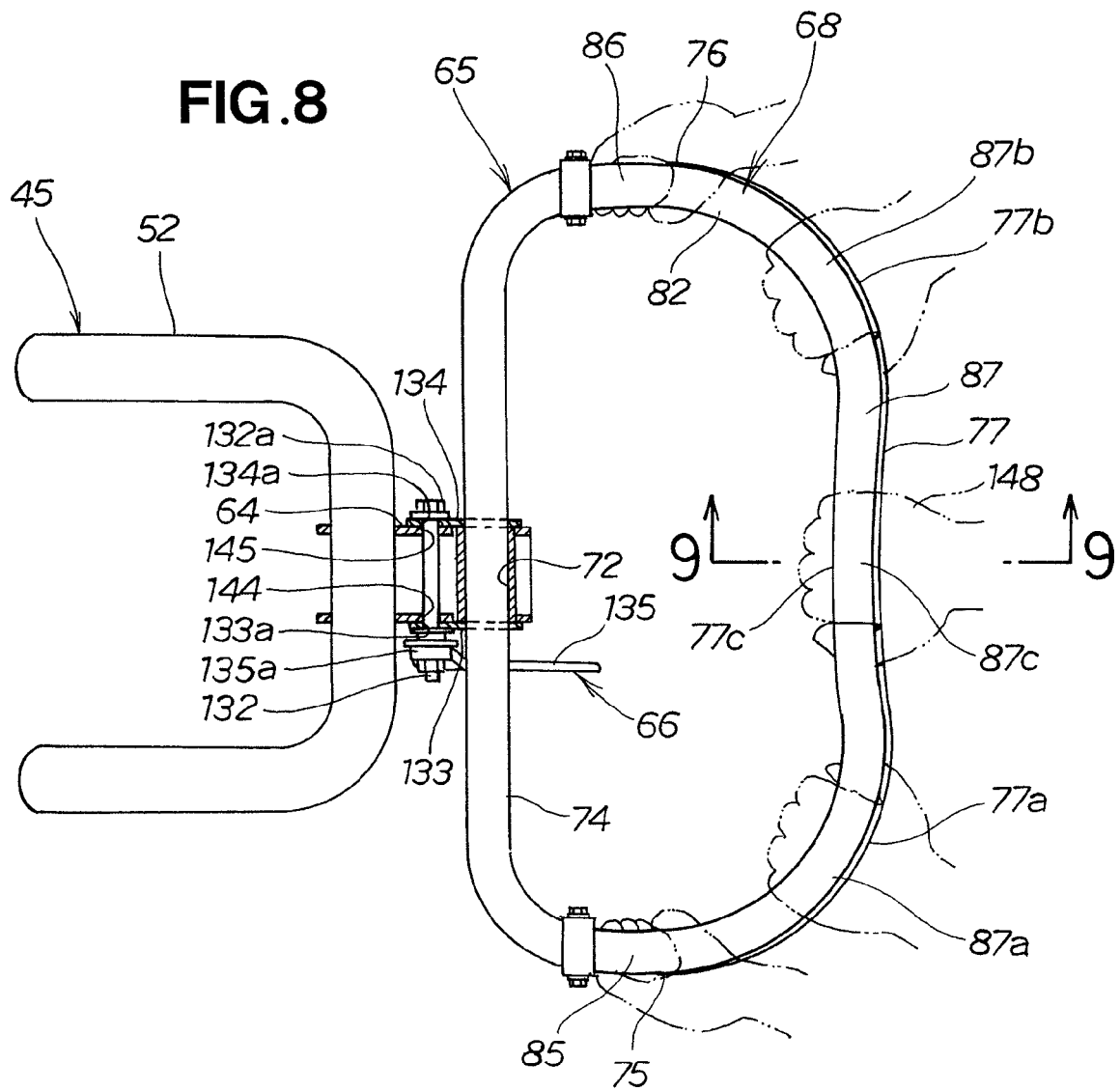
FIG. 8 is a top plan view showing the operating handle being gripped with a hand.

FIGS. 6 to 8 show the states in which the operating handle pivots.

The pivot switching means 66 has a support member 64; a support rod 132 that passes through left and right support holes 144, 145 (see FIG. 8) formed in the support member 64; left and right guide brackets 133, 134 (see FIG. 8) provided to the support rod 132 protruding from the left and right support holes 144, 145; and a switch lever 135 screwed to the support rod 132 protruding from the left guide bracket 133.

The switch lever 135 is disposed in a position near the operating handle 65 so as to be easy to operate. The operator can therefore readily pivot the operating handle.

The left and right guide brackets 133, 134 are mounted substantially in the center of the handle support shaft part 74 at a fixed interval, as shown in FIG. 8.

The left guide bracket 133 has a left guide hole 133a, which may alternately be referred to as a guide slot. The left guide hole 133a is formed in an arcuate shape around the handle support shaft part 74. The right guide bracket 134 has a right guide hole 134a, which may alternately be referred to as a guide slot. The right guide hole 134a is formed in an arcuate shape around the handle support shaft part 74. The support rod 132 is fitted into the arcuate left and right support holes 144, 145. The left and right guide brackets 133, 134 pivot along the support rod 132 via the left and right guide holes 133a, 134a. It will be understood from the foregoing that the guide brackets 133, 134 provided with the respective guide slots 133a, 134a, and the support rod 132 cooperate to define a stop member for limiting pivoting movement of the operating handle 65.

When the switch lever 135 is positioned in the holding position P1, a base part 135a is disposed near the center of the width direction of the work machine body. When the switch lever is positioned in the pivot position P2, the base part 135a is disposed so as to be separated from the center in the width direction of the work machine body. When the switch lever 135 is positioned in the holding position P1, the base part 135a and a head part 132a of the support rod 132 (see FIG. 8) push the left and right guide brackets 133, 134 against the support member 64. Consequently, the operating handle 65 is kept in a prescribed position.

When the switch lever 135 is positioned in the pivot position P2, the left and right guide brackets 133, 134 are released from being depressed by the base part 135a and the head part 132a. In this state, the operating handle 65 pivots around the handle support shaft part 74 in the longitudinal direction as indicated by the arrow, as shown in FIG. 6.

When the operating handle 65 is pivoted in the longitudinal (front-and-rear) direction, the guide brackets 133, 134 pivot along the guide holes 133a, 134a via the support rod 132. In accordance with the operating mode (e.g., tilling, cultivating, traveling), the operating handle 65 pivots between the position P3, which faces the operator, and the position P4, which is on the opposite side, across a longitudinal axis 49 as a baseline, of the handle post 45. Stated otherwise, the operating handle pivots in a front-and-rear direction without any intermediate stages or continuously.

For example, rotating the operating handle 65 to the position P4 opposite the operator 147 (see FIG. 11) causes the operating handle 65 to be disposed toward the forward direction of the work machine body (the forward direction of the transmission case 12) at an upward slope of angle $\theta 1$, with respect to a horizontal line 69. Therefore, it is possible to readily apply a load to the front part of the walk-behind tiller 10 shown in FIG. 1.

An example of applying a load to the front part of the walk-behind tiller 10 will be described in detail using FIG. 11.

Positioning the operating handle 65 in the position P3 toward the operator 147 (see FIG. 12) enables the operating handle 65 to be disposed toward the rear at a downward slope of angle $\theta 2$ with respect to the horizontal line 69, and enables the operating handle 65 to be distanced rearward from the transmission case 12 (FIG. 1). Therefore, a sufficient space can be maintained between the transmission case 12 and the operator 147, and a cultivator or the like can be readily attached to the rear end part of the transmission case 12.

An example wherein a cultivator is attached to the rear end part of the transmission case 12 will be described in detail using FIG. 12.

As shown in FIG. 8, the operating handle 65 is formed in a substantially rectangular loop shape by the handle support shaft part 74, the left and right handle side parts 75, 76, and the handle grip part 77.

The handle grip part 77 has a left handle curved part 77a, a right handle curved part 77b, and a center handle curved part (center curved part) 77c.

The left handle curved part 77a is formed so that the left end part of the handle grip part 77 curves considerably toward the outside of the loop.

The right handle curved part 77b is formed so that the right end part of the handle grip part 77 curves considerably toward the outside of the loop.

The center handle curved part 77c is slightly curved in the center of the width direction of the work machine body so as to protrude toward the inside of the loop.

The clutch operating lever 68 has left and right lever side parts 85, 86 in which a resin cover 82 overlaps the left and right handle side parts 75, 76; and a lever grip part 87 that overlaps the handle grip part 77.

The lever grip part 87 has a left lever curved part 87a, a right lever curved part 87b, and a center lever curved part (center curved part) 87c.

The left lever curved part 87a is formed so that the left end part of the lever grip part 87 curves considerably toward the outside of the loop.

The right lever curved part 87b is formed so that the right end part of the lever grip part 77 curves considerably toward the outside of the loop.

The center lever curved part 87c is slightly curved in the center of the width direction of the transmission case 12 so as to protrude toward the inside of the loop.

The clutch operating lever 68 is formed so as to overlap the left and right handle side parts 75, 76 and the handle grip part 77, when viewed from above.

When the operator 147 (see FIG. 11) grasps the center handle curved part 77c and the center lever curved part 87c with the hands 148, the operator can identify the center handle curved part 77c and the center lever curved part 87c by touch when grasping them, and can identify the center position merely by the sensation of grasping the center handle curved part 77c and the center lever curved part 87c.

In addition, providing the center handle curved part 77c and the center lever curved part 87c makes it possible to prevent the hands 148 from slipping along the operating handle 65 and the clutch operating lever 68 when the operating handle 65 and the clutch operating lever 68 are being gripped.

The left handle curved part 77a and the left lever curved part 87a are also formed in a shape that curves considerably toward the outside of the loop. Additionally, the right handle curved part 77b and the right lever curved part 87b are formed in a shape that curves considerably toward the outside of the loop. Consequently, the entire region of the handle grip part 77 and the lever grip part 87 can be formed into a shape that is easy for the operator to grasp. The operator can appropriately select the position that is easy to grip according to the work mode, for example.

As shown in FIG. 9, the travel clutch operating lever 68 has a metal lever part 81 that is pivotably disposed on the operating handle 65. The lever part 81 is covered by the resin cover part 82.

Using the metal lever part 81 in the clutch operating lever 68 makes it possible to ensure that the clutch operating lever 68 is rigid. The metal lever part 81 is covered by the resin cover 82, whereby the resin cover 82 can be readily formed in a shape that is easy to grasp. The rigidity of the clutch operating lever 68 is thereby ensured, and the clutch operating lever 68 can be very reliably gripped in a comfortable manner.

Using the resin cover 82 allows the exterior to be formed in a curved shape, and a concavity 141 to be formed in a region facing the handle grip part 77, thereby providing a pair of leg parts 142, 142. The metal lever part 81 is accommodated in the concavities 141. The lever part 81 is disposed at a position that is separated from the handle grip part 77 by a prescribed gap S, in a state where the pair of leg parts 142, 142 come into contact with the handle grip part 77.

Contact surfaces 142a, 142a are formed on the lower end parts of the inner walls of the pair of leg parts 142, 142. The contact surfaces 142a, 142a are formed in a curved shape so as to be capable of coming into contact with the outer periphery of the handle grip part 77. When the handle grip part 77 and the lever grip part 87 are grasped, each of the contact surfaces thereof come into contact with the handle grip part 77. The clutch lever can thereby be securely pressed to the handle grip part 77, and comfortable gripping can be satisfactorily ensured.

The exterior shape of the resin cover 82 is formed so as to have a curved shape. The exterior shape of the handle grip part 77 and the resin cover 82 is a substantially elliptical shape when the clutch operating lever 68 is pressed to the handle grip part 77. Since an elliptical shape is easy to grip, the gripping comfort of the clutch operating lever 68 and the handle grip part 77 can be satisfactorily ensured.

Figure 10A:
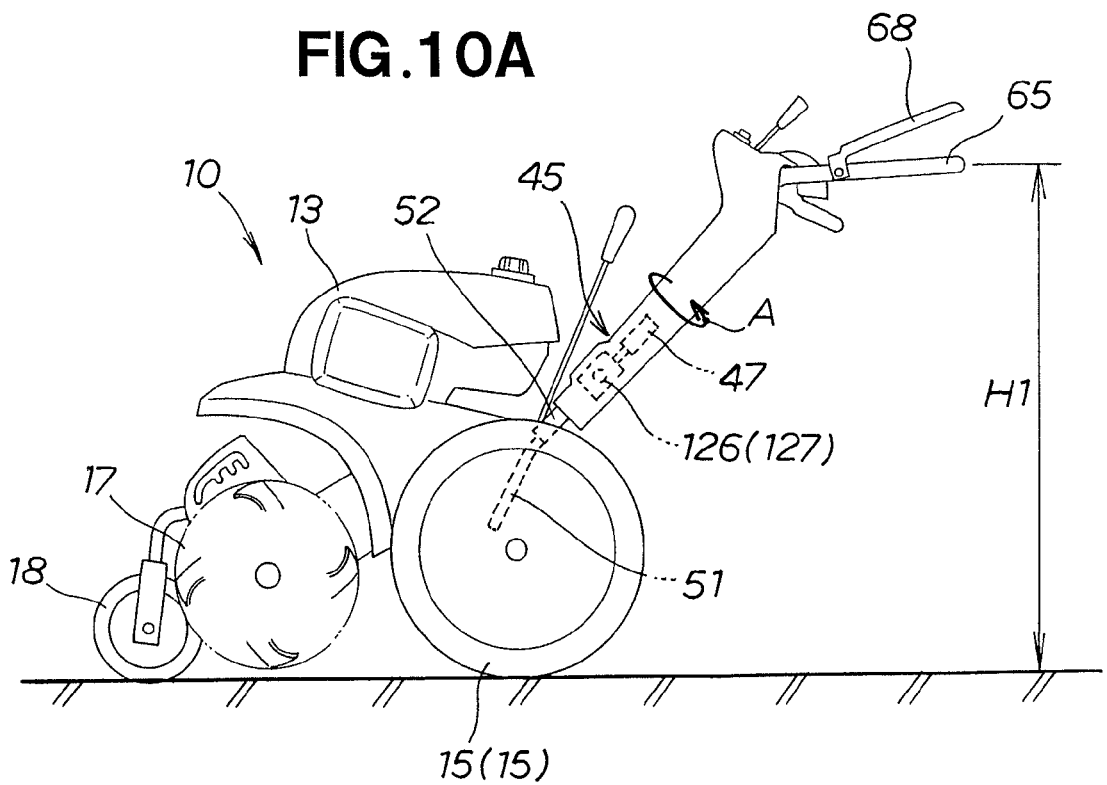
FIGS. 10A and 10B are schematic side views showing a manner in which the height of the handle post is adjusted.
Figure 10B:
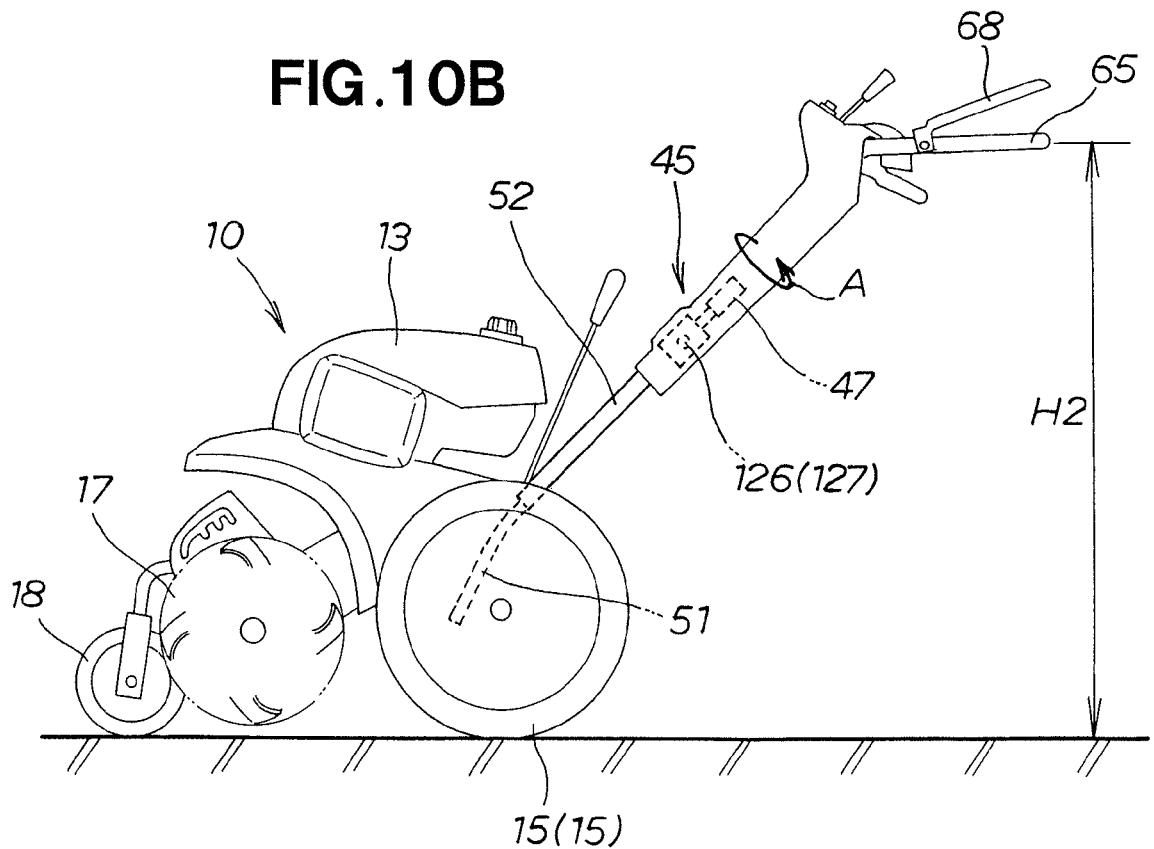

FIGS. 10A and 10B show an example of adjusting the height of the handle post.

In FIG. 10A, the switch handle 47 is manually grasped and turned as indicated by the arrow A, thereby retracting the left and right locking pins 126, 127 from a locked position to a slide position.

The upper raising post 52 can be raised or lowered in the vertical direction along the lower fixed post 51.

The handle post 45 is set to the minimum height H1 by lowering the upper raising/lowering post 52 to the bottom-most position.

Releasing the turning force from the switch handle 47 causes the left and right locking pins 126, 127 to enter the locked position by the spring force of left and right return springs 137, 138 (FIG. 4). The handle post 45 can therefore be kept at the minimum height H1.

In FIG. 10B, the switch handle 47 is manually grasped and turned as indicated by the arrow A, thereby retracting the left and right locking pins 126, 127 from a locked position to a slide position.

The upper raising/lowering post 52 can be raised or lowered in the vertical direction along the lower fixed post 51.

The handle post 45 is set to the maximum height H2 by raising the upper raising/lowering post 52 to the top-most position.

Releasing the turning force from the switch handle 47 causes the left and right locking pins 126, 127 to enter the locked position by the spring force of left and right return springs 137, 138 (FIG. 4). The handle post 45 can therefore be kept at the maximum height H2.

As depicted in FIGS. 10A and 10B, the height of the handle post 45 can be readily adjusted merely by operating (turning) the switch handle 47, and the operating handle 65 can be readily disposed at the optimal height position in accordance with the work mode and the personal attributes (e.g., body height and gripping strength) of the operator.

Figure 11:
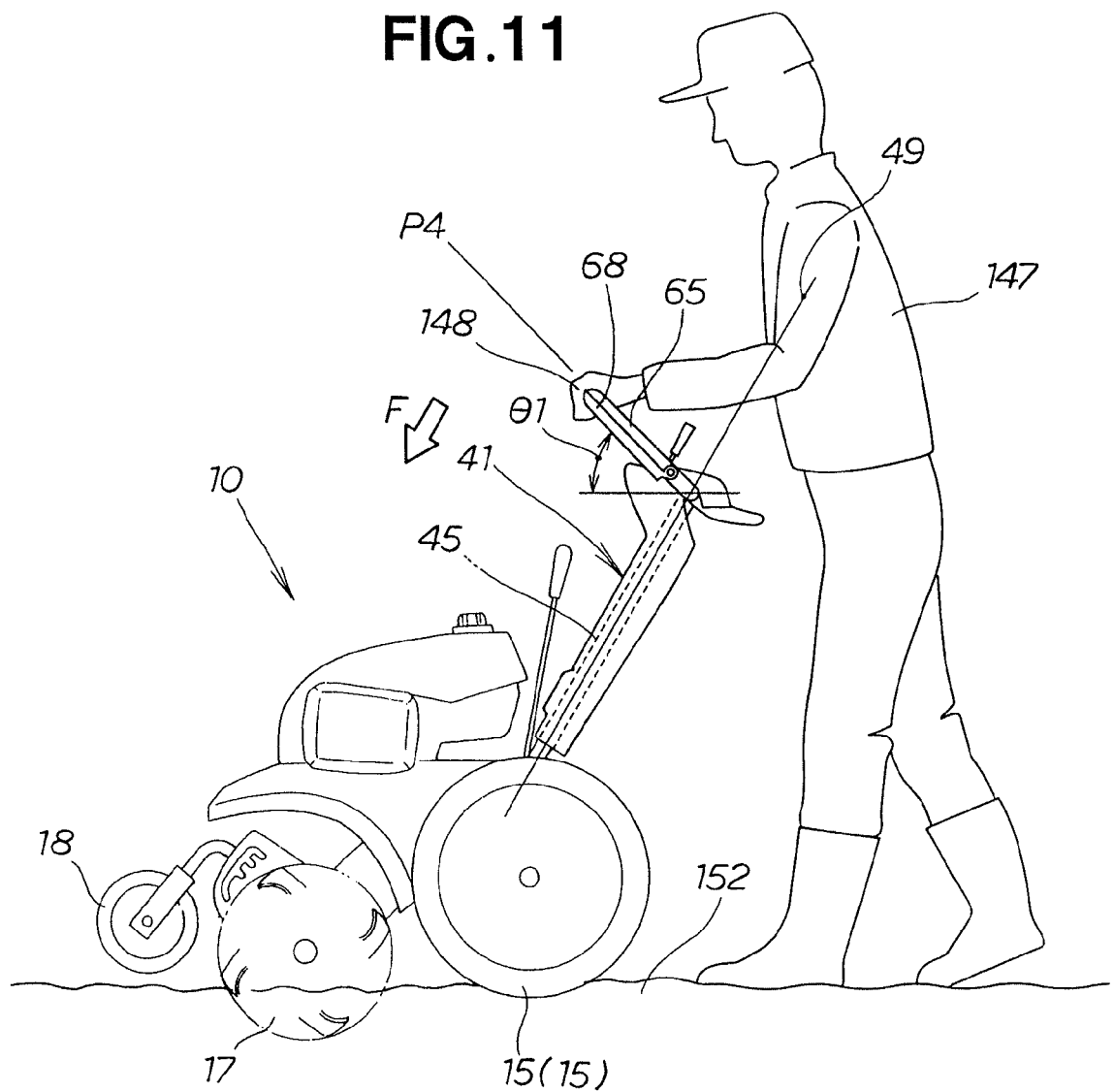
FIG. 11 is a schematic side view showing the tiller with a load applied to its front part.

Reference is made next to FIG. 11 showing an example of a load being applied to the front part of the tiller 10.

The operating handle 65 is pivoted in the forward direction beyond the longitudinal axis 49 as a baseline of the handle post 45, and is positioned in the position P4 opposite the operator 147. The operating handle 65 will be disposed at an upward slope of angle θ1 toward the front of the work machine body. Consequently, the body weight of the operator 147 can be readily applied to the front part of the walk-behind tiller 10 (i.e., the rotary work part 17) as shown by the arrow F, in a state where the operator 147 is gripping the operating handle 65. The tilling work mode can thereby be readily enabled, and tilling work can be satisfactorily carried out in a soil substrate 152 by the rotary work part 17.

Reference is now made to FIG. 12 showing an example wherein a cultivator is attached to the rear part of the tiller.

The operating handle 65 is pivoted in the rear direction past the longitudinal axis 49 as a baseline of the handle post 45 and is positioned in a position P5 toward the operator 147. In this state, the operating handle 65 is disposed so as to be substantially horizontal (i.e., the position P5 is a position that is above the horizontal line 69 shown in FIG. 6). Consequently, the operating handle 65 is distanced rearward from the rear end part 12b of the transmission case 12, and an adequate space 149 is maintained between the transmission case 12 and the operator 147.

This space 149 can be used to mount, e.g., a cultivator 151 on the rear end part 12b of the transmission case 12. A cultivating work mode can therefore be readily enabled, and a cultivating work mode can be satisfactorily carried out in soil 152 using the cultivator 151.

Furthermore, the operating handle 65 is pivotably configured with respect to the support beam part 61 (upper end part of the handle post; see FIG. 3) of the handle post 45. The operating handle 65 can therefore readily be enabled for travel work mode.

The operating handle 65 can thus be selected at the optimal height in association to the work mode of the tiller (tilling, cultivating, travel), accordingly allowing an increase in utility to be achieved.

In the present embodiment, a walk-behind tiller 10 was described as an example of a work machine; however, this embodiment is not provided by way of limitation, and may be used in a walk-behind lawn mower, a walk-behind grass cutter, or another work machine.

In the present embodiment, an example was described in which the handle post 45 was provided to the rear end part 12*b* of the transmission case 12. However, this embodiment is not provided by way of limitation, and the handle post 45 can be provided to a top part or another area of the transmission case 12.

Furthermore, in the present embodiment, an example was described in which the handle post 45 was separated into two sections comprising the lower fixed post 51 and the upper raising post 52. However, this embodiment is not provided by way of limitation, and the handle post 45 may be divided into three or more sections.

In the present embodiment, an example was described in which the cultivator 151 was attached to the rear end part 12*b* of the transmission case 12. However, this embodiment is not provided by way of limitation, and a leveling rake or the like may alternatively be attached thereto.

Obviously, various minor changes and modifications of the present invention are possible in light of the above teaching. It is therefore to be understood that within the scope of the appended claims the invention may be practiced otherwise than as specifically described.

What is claimed is:

1. A tilling machine comprising:
a tilling machine body;
a motor operatively attached to the tilling machine body;
a tiller wheel which is operatively attached to the tilling machine body and selectively rotatable by the motor, the tiller wheel having a plurality of tilling blades thereon;
a handle post provided to a rear part of the tilling machine body and extending rearwardly upwardly in an inclined manner, the handle post comprising upper and lower post segments configured to be selectively slidable, relative to one another, in a longitudinal direction of the handle post to permit a height adjustment of the handle post, the upper post segment comprising a tubular left upper portion, a tubular right upper portion, and a support beam part integrally formed with and interconnecting the left and right upper portions;
a slide switching device for switching between a released state in which the post segments are slidable in a longitudinal direction relative to each other, and a locked state in which the post segments are retained in a predetermined position, said slide switching device comprising:
a handle bracket operatively attached to a portion of the handle post;
at least one moving body operatively connected to the handle bracket which is selectively engageable with respective openings formed in the post segments to temporarily lock the position thereof in relation to one another; and
a switch handle which is operatively connected to the at least one moving body, wherein the switch handle is selectively movable to temporarily disengage the at least one moving body from at least one of the post segments to permit slidable movement thereof;
a substantially rectangular-loop-shaped operating handle connected to an upper end part of the handle post and having a support shaft part extending in a direction of width of the tilling machine body, a handle grip part, and right and left handle side parts interconnecting the support shaft part and the handle grip part, wherein the support shaft part extends substantially parallel to the support beam part of the upper handle post segment; and
a pivot switching device operatively connecting the support beam part of the upper end part of the upper post segment and the support shaft part of the operating handle, and which is configured to enable selective movement of the operating handle between an operator side position and a position opposite from an operator, each of said positions providing an operable configuration of the tilling machine, said pivot switching device comprising:
a pair of spaced apart handle support brackets attached to and extending upwardly from the support beam part of the handle post, each of the handle support brackets having a support hole formed therethrough and also having a housing concavity formed therein to receive the support shaft part of the operating handle therein;
a pair of spaced apart guide brackets attached to the support shaft part of the operating handle, each of the guide brackets having an arcuate guide slot formed therein; and
a support rod extending through the support holes of the handle support brackets and also extending through the arcuate guide slots of the guide brackets;
wherein, depending on a tilling mode, the substantially rectangular-loop-shaped operating handle is adapted to pivot on the support shaft part in a front-and-rear direction of the tilling machine across a longitudinal axis of the handle post as a baseline, between the operator side position and the position opposite from the operator, and
wherein the tilling machine is configured and arranged to support downward pressure of the operator leaning on the operating handle when the operating handle is in the position opposite from the operator, the handle grip part is disposed in a forward direction of the tilling machine and the handle side parts are sloped upwardly, whereby the tilling machine is adapted to move a lower portion of the tiller wheel downwardly into a substrate during rotary movement of said tiller wheel, in response to the operator applying downward pressure to the handle grip part of the operating handle.

2. The tilling machine of claim 1, wherein the post segments comprise at least one fixed tubular member and at least one adjustably movable tubular member which is slidably and telescopically movable relative to the fixed tubular member.

3. The tilling machine of claim 1, wherein the loop-shaped operating handle has in an inner peripheral wall comprising a central curved part provided at a widthwise center of the tilling machine body and protruding inwardly of adjacent parts of the loop.

4. The tilling machine of claim 1, wherein a travel clutch lever is pivotably provided to the operating handle, and the clutch lever includes a metal lever part that is pivotably provided to the operating handle, and a resin cover that covers the lever part.

5. The tilling machine of claim 1, wherein the pivot switching device includes a switch lever disposed near the operating handle and manually movable between a holding position in which the operating handle is maintained at a current position, and a pivot position in which the operating handle is movable between the operator side position and the position opposite from the operator.

6. The tilling machine of claim 1, wherein the guide brackets and the support rod cooperate to limit the pivoting movement of the operating handle so that when the operating handle is disposed at the position opposite from the operator, the operating handle, as seen in a side view thereof, defines a positive acute angle relative to a horizontal line intersecting the support shaft part of the operating handle.

7. The tilling machine of claim 1, wherein the operating handle has a greater lateral width than that of the handle post.

8. The tilling machine of claim 1, wherein the upper end part of the handle post is substantially U-shaped.

9. A tilling machine comprising:
   a tilling machine body;
   a motor operatively attached to the tilling machine body;
   a pair of drive wheels attached to the tilling machine body, the drive wheels being selectively rotatable by the motor;
   a tiller wheel which is operatively attached to the tilling machine body and selectively rotatable by the motor, the tiller wheel disposed in front of the drive wheels and having a plurality of tilling blades thereon;
   a handle post comprising a height-adjustment mechanism comprising at least one fixed tubular member and at least one slidably adjustable tubular member which is slidably and telescopically movable relative to the fixed tubular member, the handle post provided to a rear part of the tilling machine body and extending rearwardly upwardly in an inclined manner, the slidably adjustable tubular member of the handle post comprising a tubular left upper portion, a tubular right upper portion, and a support beam part integrally formed with and interconnecting the left and right upper portions;
   a substantially rectangular-loop-shaped operating handle connected to an upper end part of the handle post and having a support shaft part extending in a direction of width of the tilling machine body, a handle grip part, and right and left handle side parts interconnecting the support shaft part and the handle grip part, wherein the support shaft part extends substantially parallel to the support beam part of the handle post; and
   a pivot switching device operatively connecting the support beam of the upper end part of the handle post and the support shaft part of the operating handle, and which is configured to enable selective movement of the operating handle between an operator side position and a position opposite from an operator, each of said positions providing an operable configuration of the tilling machine;
   the pivot switching device comprising:
      a pair of spaced apart handle support brackets attached to and extending upwardly from the support beam part of the handle post, each of the handle support brackets having a support hole formed therethrough and also having a housing concavity formed therein to receive the support shaft part of the operating handle therein;
      a pair of spaced apart guide brackets attached to the support shaft part of the operating handle, each of the guide brackets having an arcuate guide slot formed therein; and
      a support rod extending through the support holes of the handle support brackets and also extending through the arcuate guide slots of the guide brackets;
   wherein the guide brackets and the support rod cooperate to define a stop member for limiting the pivoting movement of the operating handle so that when the operating handle is disposed at the position opposite from the operator, the operating handle, as seen in a side view thereof, defines a positive acute angle relative to a horizontal line intersecting the support shaft part of the operating handle;
   wherein the tilling machine is configured and arranged to support downward pressure of the operator leaning on the operating handle when the operating handle is in the position opposite from the operator, the handle grip part is disposed in a forward direction of the tilling machine and the handle side parts are sloped upwardly, whereby the tilling machine is adapted to move a lower portion of the tiller wheel downwardly into a substrate during rotary movement of said tiller wheel, in response to the operator applying downward pressure to the handle grip part of the operating handle.

10. The tilling machine of claim 9, wherein the handle post has a plurality of post segments separated in a longitudinal direction, and the post segments are configured so as to be slidable in a longitudinal direction.

11. The tilling machine of claim 9, wherein the loop-shaped operating handle has in an inner peripheral wall a central curved part provided at a widthwise center of the tilling machine body and protruding inwardly of the loop.

12. The tilling machine of claim 9, wherein a travel clutch lever is pivotably provided to the operating handle, and the clutch lever includes a metal lever part that is pivotably provided to the operating handle, and a resin cover that covers the lever part.

13. The tilling machine of claim 10, wherein the post segments include a slide switching device for switching between a state in which the post segments are slidable in a longitudinal direction, and a state in which the post segments are kept in a predetermined position.

14. The tilling machine of claim 13, wherein the slide switching device is disposed with an upper one of the post segments and includes a handle that is manipulated by the operator for switching between the slidable and kept states of the post segments.

15. The tilling machine of claim 9, wherein the pivot switching device includes a switch lever disposed near the operating handle and manually movable between a holding position in which the operating handle is maintained at a current position, and a pivot position in which the operating handle is movable between the operator side position and the position opposite from the operator.

* * * * *